United States Patent
McCowin

(10) Patent No.: US 6,851,635 B2
(45) Date of Patent: Feb. 8, 2005

(54) CONDIMENT MILL

(75) Inventor: Peter D. McCowin, Enumclaw, WA (US)

(73) Assignee: William Bounds, Ltd., Torrance, CA (US)

( * ) Notice: Subject to any disclaimer, the term of this patent is extended or adjusted under 35 U.S.C. 154(b) by 11 days.

(21) Appl. No.: 10/119,668

(22) Filed: Apr. 9, 2002

(65) Prior Publication Data
US 2002/0145065 A1 Oct. 10, 2002

Related U.S. Application Data

(60) Provisional application No. 60/282,295, filed on Apr. 9, 2001.

(51) Int. Cl.[7] .................................................. A47J 42/04
(52) U.S. Cl. .................................. 241/169.1; 241/259.1
(58) Field of Search ........................... 241/169.1, 259.1, 241/258, 168, 169; 222/142.1–142.7

(56) References Cited

U.S. PATENT DOCUMENTS

| | | | | |
|---|---|---|---|---|
| 3,168,256 A | * | 2/1965 | Bounds et al. ........... | 241/169.1 |
| 4,231,527 A | | 11/1980 | Bounds | |
| 4,591,104 A | | 5/1986 | Bounds | |
| 5,145,119 A | * | 9/1992 | Lowe ....................... | 241/101.2 |
| 5,176,329 A | * | 1/1993 | De Coster et al. ....... | 241/169.1 |
| 5,897,067 A | * | 4/1999 | Tardif et al. ............. | 241/169.1 |
| 6,164,574 A | * | 12/2000 | Weibel ...................... | 241/168 |
| 6,405,951 B1 | * | 6/2002 | Wu .......................... | 241/169.1 |

* cited by examiner

Primary Examiner—Allen Ostrager
Assistant Examiner—Jimmy T Nguyen
(74) Attorney, Agent, or Firm—Edward A. Sokolski

(57) ABSTRACT

A device for grinding spices such as salt, pepper, cinnamon, etc. has a grinder rotor which has a removable keeper member which facilitates the ready removal of the rotor for cleaning or replacement. The grinder elements are made of ceramic material such as alumina silicate which eliminates the possibility of corrosion or rusting as with metal parts. The mill provides dual grinding action by utilizing separate grinding elements to provide either coarse grinding or fine grinding, as may be desired. For coarse grinding, the condiment only passes through the coarse grinding element while for fine grinding, the condiment first passes through the coarse grinding element and then passes through the fine grinding element.

3 Claims, 3 Drawing Sheets

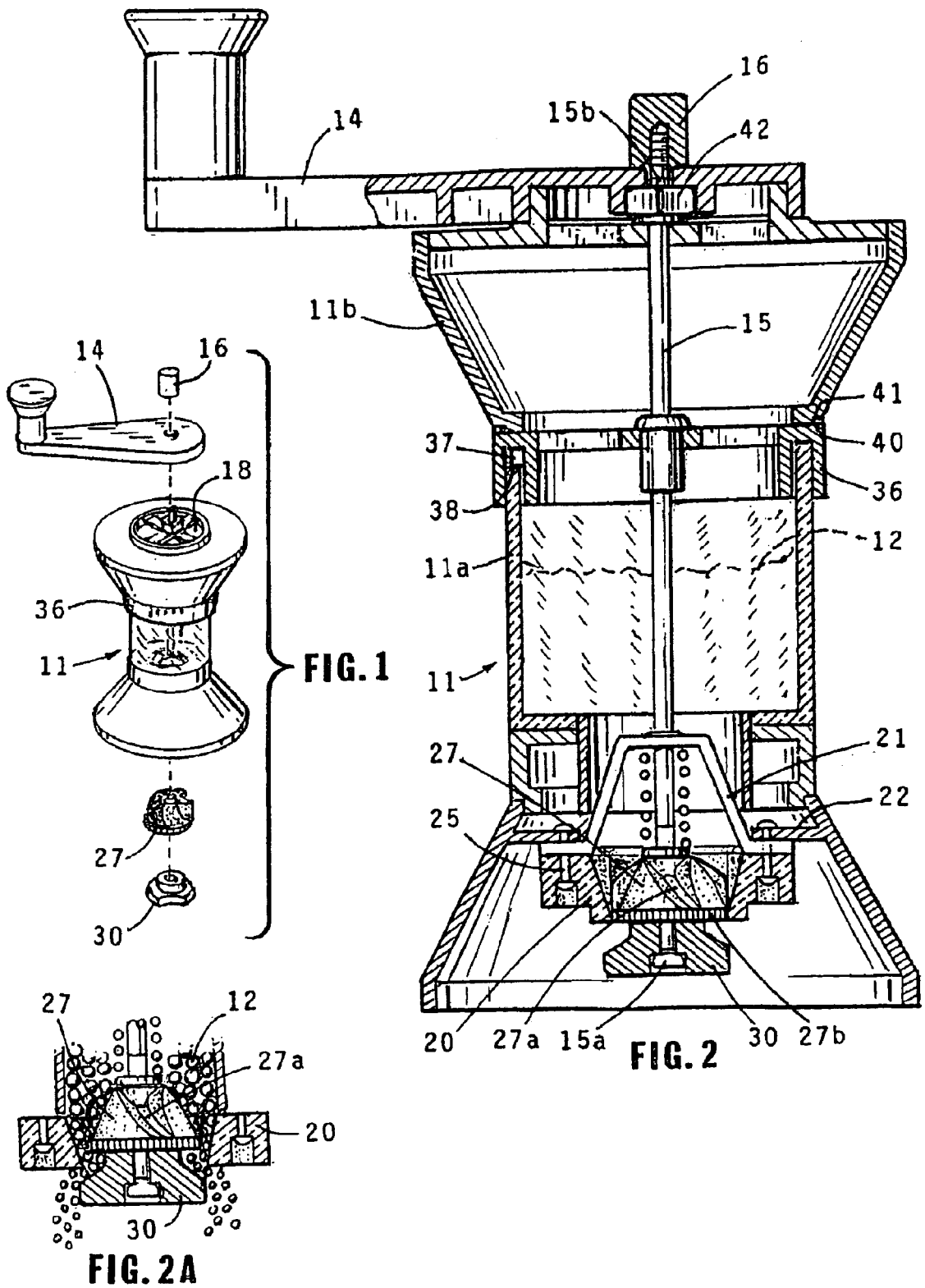

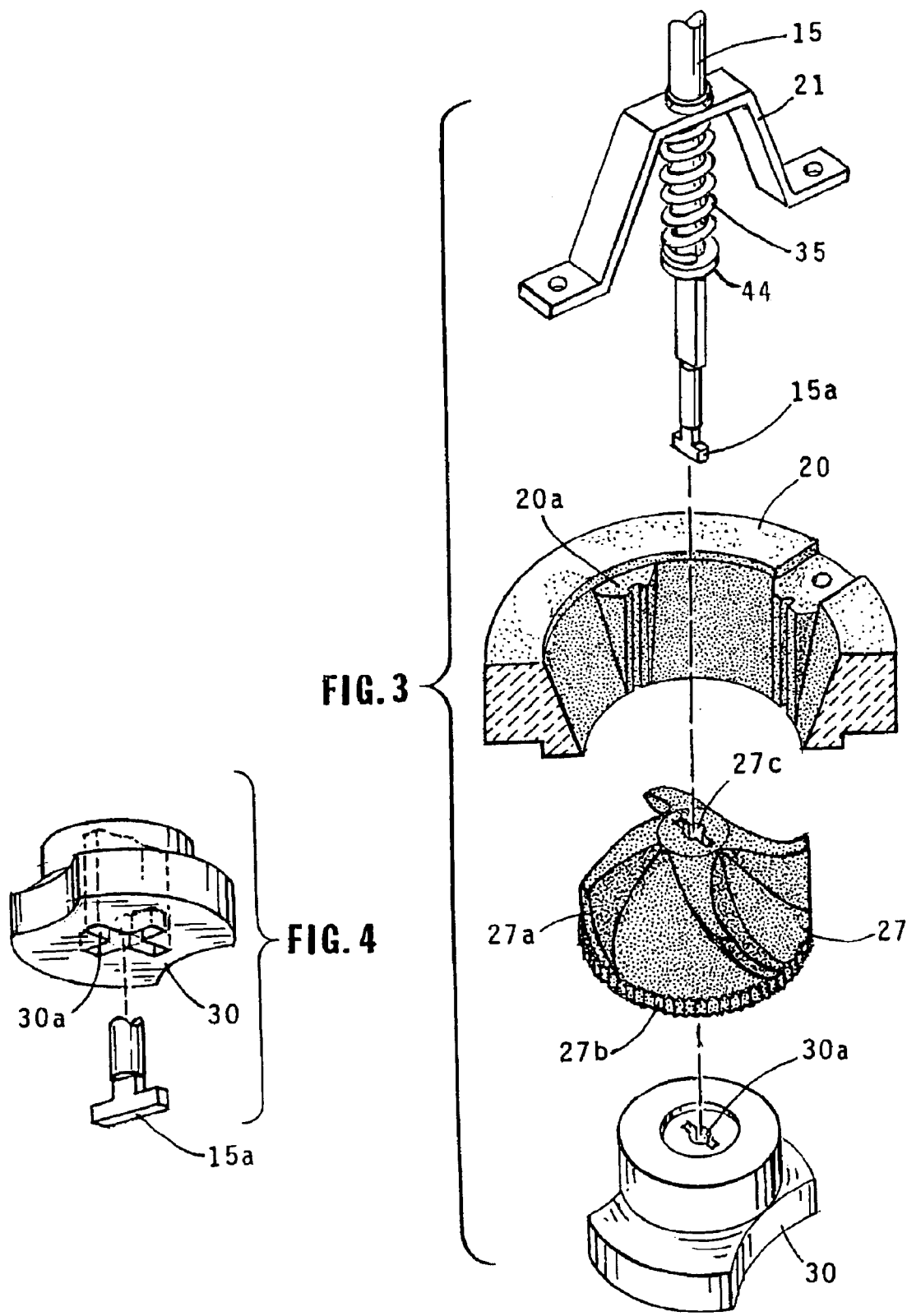

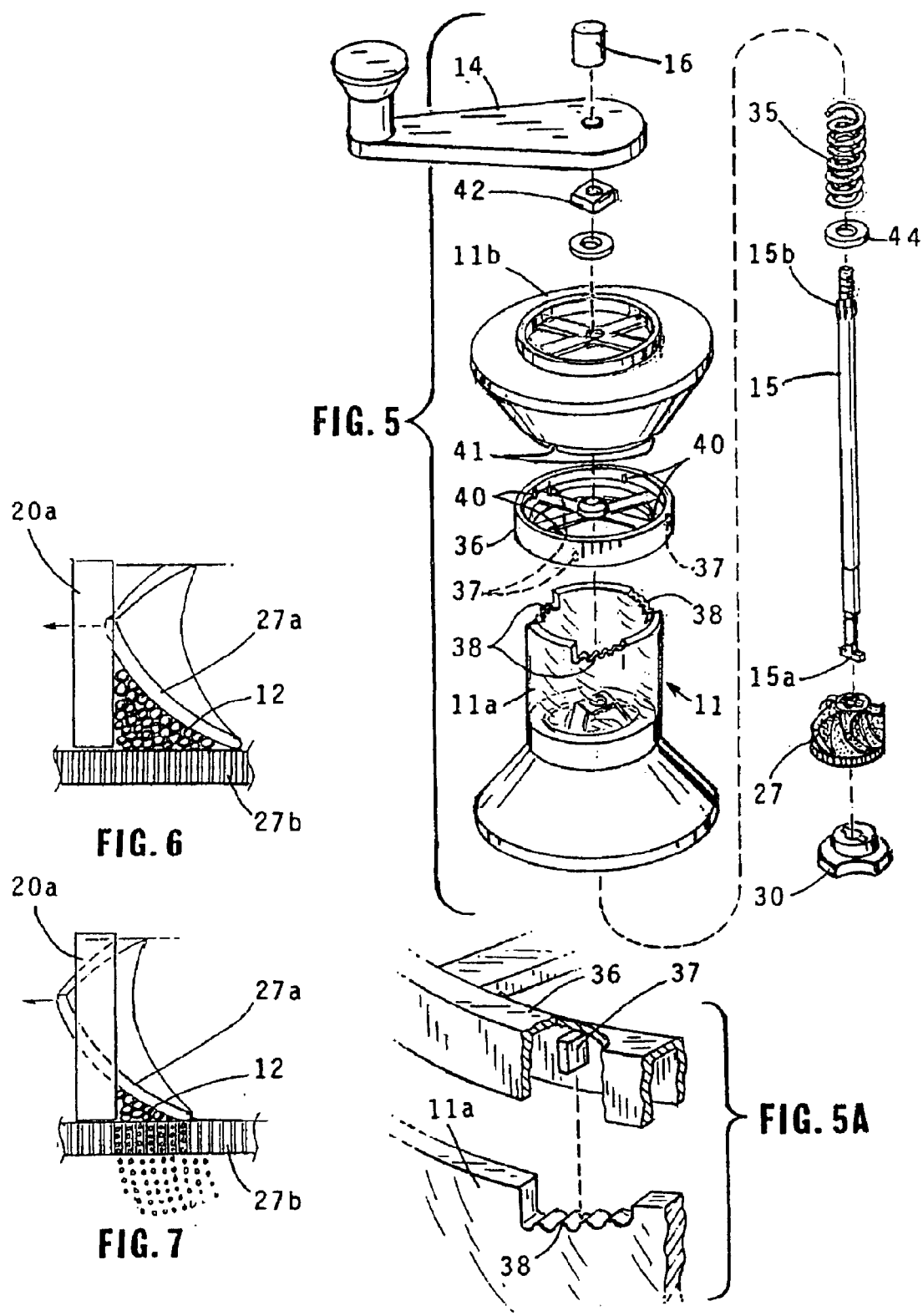

CONDIMENT MILL

Applicant claims priority based on Provisional Patent Application No. 60/282,295 filed on Apr. 9, 2001.

BACKGROUND OF THE INVENTION

1. Field of the Invention

This invention relates to condiment mills and more particularly to such a device employing a removable grinder rotor made of ceramic material which provides dual grinding action by separate grinders on the rotor to provide fine grinding or coarser grinding.

2. Description of the Related Art

In U.S. Pat. Nos. 3,168,256 and 4,591,104 condiment mills are described which employ a grinder mechanism which can be selectively set to grind condiments to any one of several consistencies.

A drawback of these prior art devices are that the grinding rotor cannot be removed without taking apart the devices nor can very fine grinding be achieved.

SUMMARY OF THE INVENTION

The device of the present invention overcomes the shortcomings of the prior art by providing a rotating ring which allows one to set the type of grind and to facilitate the removal of the grinding rotor for proper cleaning and for replacement by the use of a latching member which is rotated to lock the grinding rotor into place. The device of the present invention is an improvement over the '256 and the '104 patents in that the coarseness of the grind can be achieved by selectively rotating a ring mechanism to a desired position for coarse grinding. A position for fine grinding subsequent to coarse grinding is provided with coarsely ground particles passing through a set of serrated "teeth" for extra fine grinding.

The grinder is set in a coarse grinding position and by turning the set ring in a clockwise direction, will change the coarseness of the grind via a stair step set of notches on the body of the condiment mill and a protruding tab on the adjustment ring. The ceramic grinding rotor has two sets of grinders, one large and one small for use in providing a "double" grinding effect. Also, the use of a latching member which is rotated 90 degrees, locks the grinding rotor into place and can be rotated back 90 degrees and the rotor removed.

It is therefore an object of this invention to provide a condiment mill which allows for a very fine grind of condiments.

It is a further object of this invention to provide a simpler and expeditious way to remove the grinder rotor.

Other objects of the invention will become apparent from the following description in conjunction with the accompanying drawings.

DESCRIPTION OF THE DRAWINGS

FIG. 1 is an exploded view of a preferred embodiment of the invention showing the grinder rotor and handle removed from the mill;

FIG. 2 is a side elevational cross sectional view of the preferred embodiment;

FIG. 2A is a cutaway elevational cross sectional view showing the grinder rotor in its upward position;

FIG. 3 is an exploded view of the grinder mechanism of the preferred embodiment of the invention;

FIG. 4 is a bottom perspective view of the latching device of the preferred embodiment for holding the rotor in position;

FIG. 5 is an exploded view of the preferred embodiment;

FIG. 5A is a cutaway perspective view illustrating the grinding adjustment mechanism of the preferred embodiment.

FIG. 6 is a schematic drawing showing the condiment being initially ground between the flutes and the stator bosses with the mill set for fine grinding; and FIG. 7 is a schematic drawing showing the fine grinding action by the serrated teeth of the grinder rotor after the initial grinding.

DETAILED DESCRIPTION OF THE INVENTION

Referring to FIGS. 1 and 2, a preferred embodiment of the invention is illustrated. The device comprises a container in which the condiment 12 which can be pepper, salt, cinnamon, etc., is contained. Grinder handle 14 is removably attached to the threaded end portion of grinder shaft 15 by means of threaded retainer piece 16. When handle 14 is removed, as shown if FIG. 1, the container can be filled with a condiment through the opening 18.

The stator 20 of the grinder is fixedly mounted by means of bolts 25 on a ledge 22 which extends from the wall of the container. Stator 20 has pairs of truncated triangular bosses 20a which protrude inwardly. Grinder rotor 27 has a plurality of flutes 27a formed thereon which, when the rotor is rotated interact with the stator bosses to effect grinding action of the particles which pass there between. Rotor 27 also has a serrated edge 27b which operates in conjunction with the stator to provide extra fine grinding.

The rotor is held in position by latching member 30 which can best be seen in FIGS. 3–5. The latching member and the grinder rotor have elongated apertures 30a and 27c respectively through which an elongated latching bar portion 15a formed at the end of grinder shaft 15 fits enabling the rotor to be locked into place by turning latching member 30 in a 90 degree clockwise direction. The shaft is centered on mount 21 and is resiliently urged downwardly by means of spring 35 which abuts on one end against washer 44 which in turn abuts against rotor 27 and on the other end against mount 21 which is attached to the container housing by means of bolts 25.

The rotor 27 is installed in position by pressing latching member 30 upwardly against the rotor with the latching bar portion 15a inserted through apertures 27c and 30a. Once the rotor is in position, latching member 30 is rotated 90 degrees, as shown in FIG. 4 to lock the rotor in position. The rotor can be readily removed by rotating latching member 30 back 90 degrees from its locked position to permit bar member 15a to be released from its latching engagement with latching member 15. Referring now to FIGS. 2, 2A and 5–7, the mechanism for adjusting the fineness of the grinding is illustrated. The top edge of transparent container portion 11a has three similar angularly indented portions 38 with indents formed therein at successively lower levels. Grinding adjuster control ring 36 has three tabs 37 extending inwardly therefrom (see FIG. 5A). When the adjuster is rotated, the tabs are drawn into different indents of the indented portions 38 by the biasing action of spring 35 to raise or lower adjusted 36. Square nut 42 is affixed to shaft 15 by means of splines 15b (see FIG. 5) onto which it is force fitted by means of corresponding indents in nut 42. Spring 35 exerts a downward bias on shaft 15 which carries nut 42 along with it thereby holding upper portion 11b of the container and adjuster in spring biases contact with lower container portion 11a. Thus, rotating adjuster ring 36 will raise or lower rotor 27 for coarser or finer grinding. The adjuster has dogs 40 which fit into recesses 41 on the upper container portion 11b to prevent rotation of the adjuster when the handle 14 is rotated to provide grinding action.

The operation of the grinder will now be described in connection with FIGS. 2, 2A, 6 and 7. The grinder is shown in an upward grinding position for coarse grinding in FIG. 2A and a downward grinding position for fine grinding in FIG. 2. In the coarse grinding position, as shaft 15 and rotor 27 are rotated, the particles are ground between flutes 27a and the truncated triangular bosses 20a. The fineness of the grinding can be varied by changing the vertical position of the rotor relative to the stationary bosses. With coarser grinding, the particles are not ground between the serrated teeth 27b of the rotor but, pass around this edge as shown in FIG. 2A. The rotor is shown in the fine grinding position in FIGS. 2 and 7. When in this position, the particles are first coarsely ground between flutes 27a and bosses 20a. The particles then pass between the serrated edge 27b and the bottom portion of bosses 20a and are finely ground.

As indicated above, the rotor and stator are made of a ceramic material such as alumina silicate.

What is claimed is:

1. A condiment mill comprising:

a container for containing condiment to be ground;

a frustro-conical stator unit fixedly mounted within said container, said stator unit tapering inwardly towards the bottom edge thereof, said stator unit having truncated bosses along the sides thereof forming coarse grinding elements, said truncated bosses at the bottom edges of said stator unit forming fine grinding elements, a frustro-conical rotor unit rotatably mounted within said container, said rotor unit tapering inwardly towards the top edge thereof, said rotor unit having flutes along the sides thereof, said flutes forming coarse grinding elements, said rotor unit further having fine grinding elements formed along the bottom edge thereof, said stator unit and said rotor unit coarse grinding elements forming a first grinder and said rotor unit fine grinding elements and the bottom edge of said stator unit forming a second grinder;

adjuster means for adjusting the position of the rotor unit relative to the stator unit to a first coarse grinding position whereat the bottom edge of the rotor unit is substantially above the bottom edge of said stator unit and the condiment is solely ground by said coarse grinding elements of said stator unit and said rotor unit and a second fine grinding position whereat the fine grinding elements on the bottom edge of said rotor unit are directly opposite the bottom of said stator unit and the condiment is first ground by said coarse grinding elements of said stator unit and said rotor unit and then by said fine grinding elements of said stator unit and said rotor unit; and Means for rotatably driving said rotor unit whereby coarse grinding is provided in said first position and fine grinding is provided in said second position.

2. The condiment mill of claim 1 wherein said adjuster means comprises a plurality of indented portions formed in the wall of said container, an adjuster control rotatably mounted on said container, a plurality of tabs mounted on said adjuster control, said tabs entering various ones of said indented portions in abutment there against as said adjuster control is rotated, and a spring for urging said adjuster tabs against said indented portions.

3. The condiment mill of claim 1 wherein the fine grinding elements formed on the stator rotor unit are serrations.

* * * * *